Figure 1:
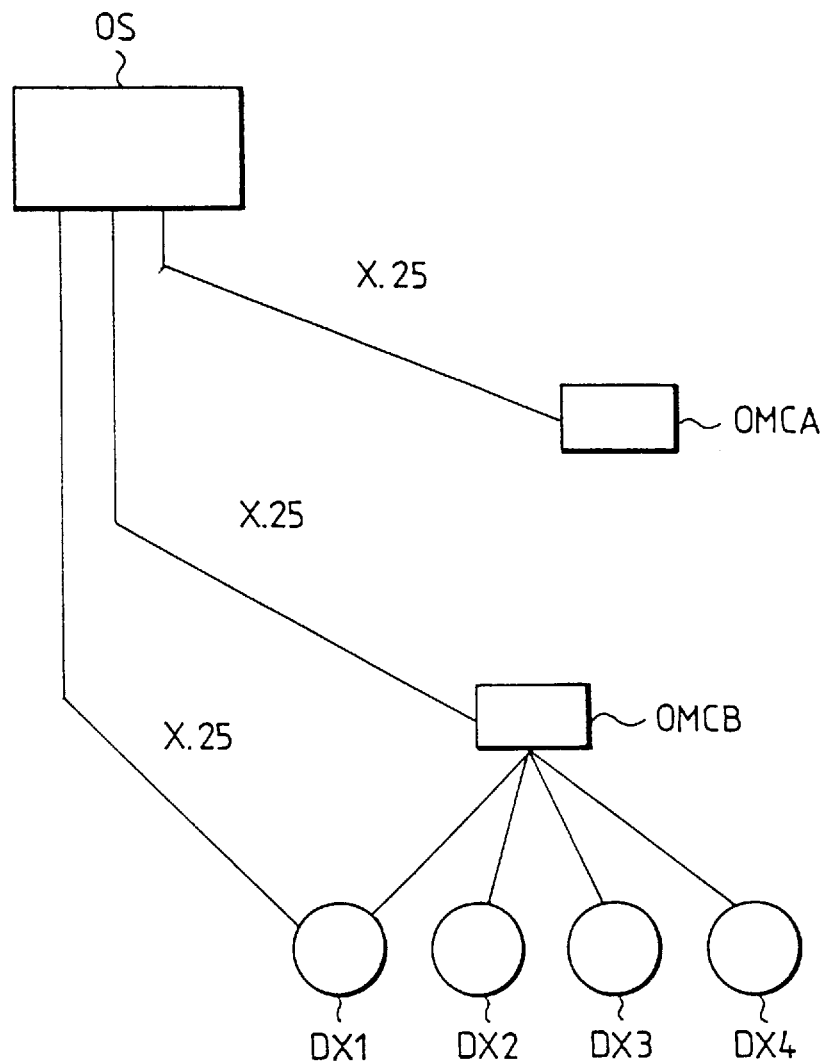

United States Patent

Järvenpää

[11] Patent Number: 5,832,524
[45] Date of Patent: Nov. 3, 1998

[54] METHOD FOR TRANSFER OF DATA FILES FROM A MASS STORAGE OF A COMMUNICATION DEVICE TO A POST-PROCESSING SYSTEM BY USING CONTROL FILES

[75] Inventor: Anssi Järvenpää, Helsinki, Finland

[73] Assignee: Nokia Telecommunications Oy, Espoo, Finland

[21] Appl. No.: 776,780
[22] PCT Filed: Aug. 7, 1995
[86] PCT No.: PCT/FI95/00417
§ 371 Date: Apr. 1, 1997
§ 102(e) Date: Apr. 1, 1997
[87] PCT Pub. No.: WO96/05703
PCT Pub. Date: Feb. 22, 1996

[30] Foreign Application Priority Data

Aug. 8, 1994 [FI] Finland ................................. 943668

[51] Int. Cl.⁶ .................................................. G06F 17/30
[52] U.S. Cl. ........................... 707/204; 707/202; 707/203; 707/10
[58] Field of Search ................... 707/204, 202, 707/203, 10

[56] References Cited

U.S. PATENT DOCUMENTS 5,504,883  4/1996  Coverston et al. ..................... 707/202
5,745,905  4/1998  Larsson et al. ........................ 707/203

FOREIGN PATENT DOCUMENTS

0631233A2  12/1994  European Pat. Off. .
94/17474   8/1994   WIPO .
94/18634   8/1994   WIPO .

OTHER PUBLICATIONS

Patent Abstract of Japan, vol.17,No.326,P–1560,Feb. 12 Feb 1993.
Patent Abstract of Japan, vol.16,No. 100, P–1323, 6 Dec. 1991.
Patent Abstract of Japan,vol. 16, No. 231, P–1361,Feb. 18, 1992.

Primary Examiner—Thomas G. Black
Assistant Examiner—Hosain T. Alam
Attorney, Agent, or Firm—IP Group of Pillsbury Madison & Sutro LLP

[57] ABSTRACT

A method for transfer of files produced by a communication device from a mass storage of the communication device to a memory of a post-processing system for the files maintains the control file of the communication device by marking it with the information on the state of the files in each mass storage of the communication device, and a time stamp of the latest writing operation into it. This is followed by reading of the control file into a post-processing system, and comparing the file to another control file which is in the memory of the post-processing system and which is updated in each transfer. Reading into the post-processing system of such files of the communication device that have been modified on the basis of the comparison of control files since the latest updating of the control files of the post-processing system. The final step comprises updating of the control file of the post-processing system by marking it with the information as to the files that have been transferred, and copying the information to the communication device for indicating the capacity made available in the mass storage of the communication device.

6 Claims, 2 Drawing Sheets

METHOD FOR TRANSFER OF DATA FILES FROM A MASS STORAGE OF A COMMUNICATION DEVICE TO A POST-PROCESSING SYSTEM BY USING CONTROL FILES

This application is a national phase of international application PCT/ F195 / 00417 filed Aug.7,1995 which designated the U.S.

The present invention relates to a method for transfer of files produced by a communication device from a mass storage of the communication device to a memory of a post-processing system for the data contents of said files.

Digital switching exchanges and similar communication devices produce and are fed with a lot of various kinds of data which are to be stored for later processing. Such data include, for example, new or changed subscriber information, charging data of calls, various kinds of alarms, etc. The post-processing procedures include, for example, system maintenance, error analysis, charging subscribers, making statistics, etc.

Usually, communication devices comprise mass storages of their own, for example, a hard disk onto which they store the required data into files. Individual communication devices do not usually perform by themselves the post-processing of the data gathered, but it is done in a centralized manner by a separate post-processing system, such as an operation and maintenance center, to which, through an operation and maintenance network, the data are gathered and stored by means of a file transfer, access and management service.

In this case, a problem occurs concerning the free storage capacity of the mass storage of the communication device, because without deleting previous data that has already been sent forward, the memory will very soon become full. Prior art methods and protocols have required measures on the part of the operator, or include complicated verification routines straining system internal signaling channels.

It is the purpose of this invention to create a simple and reliable way for transfer of files from a communication device to a post-processing system. In order to achieve this, the method of the invention is characterized by maintaining the control file of a communication device by marking it with information on the state of the files in each mass storage of a communication device, and/or a time stamp of the latest writing operation into it;

reading of said control file into a postprocessing system, and comparing it to another control file which is in the memory of the post-processing system and which is updated in each transfer;

reading into the post-processing system of such files of a communication device that have been modified on the basis of the comparison of control files since the latest updating of a control file of the post-processing system;

updating of the control file of the postprocessing system by marking it with information on the files that have been transferred, and copying said information to a communication device for indicating the capacity made available in the mass storage of the communication device.

Other preferred embodiments of the invention are characterized by what is set forth in the attached claims.

Figure 2:
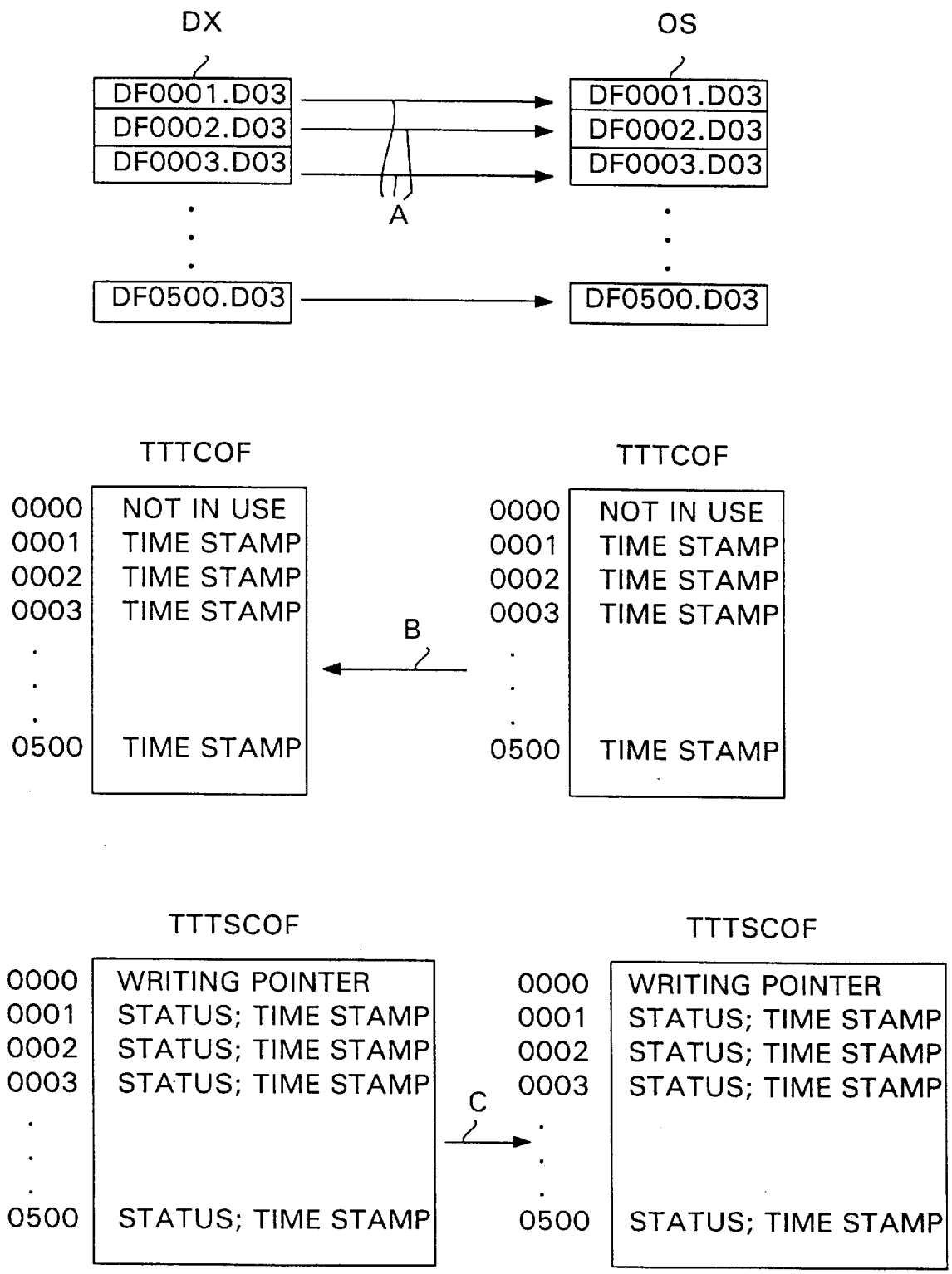

In the following, the invention will be described in closer detail with reference to the accompanying drawings in which FIG. 1 shows a general overview of a communication network in which the invention can be applied, FIG. 2 shows the method of the invention in practice as the files are being read and written into.

As an example of a communication device, the Nokia Telecommunications DX 200 switching exchange and connection from it to a post-processing system is hereby used. It is possible to connect the DX 200 exchanges, marked DX1 –DX4 in FIG. 1, to a DX 200 operations and maintenance network. By means of the operations and maintenance network, the operation of the exchanges and the gathering of data they produce can be centralized in a desired Operations and Maintenance Center, OMC. From the exchanges DX1 –DX4 or from the OMC (OMCA, OMCB in the figure), it is Possible to arrange a communication link to, for example, a post-processing system of a packet network terminal X.25, marked OS (Operation System) in the figure. The data link is able to transfer files by a standard protocol, for example, by a FTAM (File Transfer Access and Management, ISO IS8571) protocol.

From any point into which a data link has been installed in the operations and maintenance network, data gathered in the point can be sent to a post-processing system by a FTAM protocol. Thus, the post-processing system serves as a controller for the FTAM transfer. Within the scope of the invention, it is, however, possible to use any other standard data transfer protocol, such as a FTP (File Transfer Protocol) protocol of a local network, and a TCP/IP local network interface.

Switching exchanges DX1 . . . DX4 store the data they gather into files of standard length in their mass storage devices, for example, on a hard disk. Date, indicating when the respective data files have been written into, and the state of the data file are marked into a separate control file. The possible states of the data files are:

(1) open, in which case the data file is being written into:

(2) full; and (3) transferred.

The exchange may comprise several mass storages in which case it is possible to sort the data to be stored. Disk space according to requirements can be reserved in each mass storage. The disk space consists of a number of data files. As the data is being stored, it is appended to a data file which is open at that particular moment. The data is written into this file until it is full after which the storing of data continues in the next file. It is also possible to determine a period of time, and when said period of time has lapsed, the data file is closed and the next file is opened for storing of data.

A control file is also located in the mass storage of the exchange, and it comprises one record per each data file. A corresponding control file is located in the postprocessing device. It is marked with a date indicating when each data file has been transferred to the mass storage of the post-processing device, and it does not require any data concerning state.

As the post-processing device begins to collect data from the exchange, it first reads the control file of the exchange by a FTAM protocol. By comparing the control file it has read to the control file of its own, the postprocessing device infers which data files are full, new, or into which ones new data have been written. The selection criteria can be applied to the files to be transferred so that, for example, only the files that have become full are transferred. The post-processing system reads to itself the files to be transferred by the FTAM protocol. As a matter of fact, according to the invention, no other kind of communication besides the FTAM protocol is required between the system and the exchanges. After this, the post-processing device marks its control file with information on which data files have been transferred, and writes its control file in the mass storage of the communication device as well. By comparing the control files, the communication device can in such a case infer which data files have been transferred into the post-processing system, and on the basis of this information, make disk space available on its mass storage for new data.

The post-processing system comprises a program which compares the control file of the exchange or the communication device to the control file of the system, and which updates the control file of its own and carries out the required FTAM file transfers. Between the entire post-processing system and the exchanges, there exists a common agreement on the naming principles.

With reference to FIG. 2, the following illustrates how the method of the invention works in practice by a FTAM protocol.

In the example of FIG. 2, the names of the data files to be stored in the mass storage of the communication device (DX) consist of a two-letter first part DF and a four-digit file serial number, for example, 0002. The extension part of the file consists of the letter D and a two-digit number associated with the number of the mass storage device. The number of the first data file is one (1), and the number of the last file naturally corresponds to the total number of files. If, for example, the memory 3 includes 500 data files each of which of 10 kilobytes and which have DF as the first part of their name, the directory includes files DF0001.D03 , DF0002.D03, . . . DF0500.D03 which take up 5 megabytes of disk space in all.

The data files are located in a separate directory on disks of the DX 200 system. They are automatically created one by one as the need arises in normal operation. Each mass storage of the communication device comprises two control files, TTTCOF and TTSCOF. The records of the control file TTSCOF for data storage of the communication device itself comprise the status and time stamp of the data files associated with them, which time stamp indicates the latest updating of status. The records of the control file TTTCOF for data transfer, maintained by the post-processing system OS, only comprise time stamps on the data files that have been transferred. Each record of a control file is associated with the data file having the same sequence number.

In the TTSCOF control file, the status of data files is described as bytes. The possible values for them are, as described above, open (00H), full (01H), and transferred (02H). The time stamp consists of seven binary coded decimal bytes. The following will illustrate the structure of a time stamp with an example.

TABLE 1

Structure of time stamp.

| BYTE | STAMP | 23rd March 1992 10:35:42 |
| --- | --- | --- |
| 0 | seconds | 42H |
| 1 | minutes | 35H |
| 2 | hours | 10H |
| 3 | days | 23H |
| 4 | months | 03H |
| 5 | years (tens) | 92H |
| 6 | years (thousands) | 19H |

The first record (number zero) of either one of the files TTSCOF and TTTCOF is not associated with data files. The zero record of TTTCOF plays no role. The TTSCOF zero record comprises a write pointer indicating where the next data to be received are to be written. The first word of the TTSCOF zero record includes the number of the data file currently open, and the following double word comprises the offset point of the data file. The last word is not in use.

Apart from the communication device DX, also the post-processing system OS can read (arrow C) the control file TTSCOF of the communication device. The integrity of the system is achieved by limiting the writing right so that only the communication device is given the right to write into the TTSCOF file, and only the post-processing system is given the right to write into the TTTCOF file (arrow B).

By comparing the contents of the control files, the communication device DX or the peripheral device interface OMC can infer which files have been transferred to the operating system, which files are full of data, and which file is currently open. The next data file to be opened is the oldest of the transferred files and thus the new data are written over the previous data of the file which was opened. In this way, the disk space which the system uses for storing data remains reasonable.

The post-processing system advantageously utilizes a polling cycle during which it reads (arrow C) the contents of the TTSCOF file of data storing by using FTAM procedures. After this, it compares the TTSCOF to the contents of the TTTCOF copy which is in the postprocessing system. On the basis of the time stamps and the status data, the system infers which data files must be transferred because they have, for example, become full. Having successfully transferred (arrows A) data files by the FTAM protocol, the post-processing system updates the TTTCOF file by writing into it the names of the files that have been transferred and the time stamp of the transfer. After this, the updated TTTCOF is copied (arrow B) to the DX 200 system by using the FTAM protocol.

The user can determine that the transferred files are stored in the mass storage of the communication device (DX) for at least a certain time. If for this reason, or due to a malfunction in the post-processing system, the number of data files available for overwriting, i.e. the usable mass storage capacity, falls below a predetermined level, an alarm is given.

It is obvious for a person skilled in the art that the embodiments of the invention are not restricted to the examples above but may freely vary within the scope of the attached claims. Thus, a communication device does not here refer only to switching exchanges, but to any digital data transfer device which collects data to a memory of its own for later transfer to centralized post-processing.

I claim:

1. A method for transfer of files produced by a communication device from a mass storage of the communication device to a memory of a postprocessing system for the data contents of said files comprising:

maintaining a control file (TTSCOF) of the communication device by marking the control file with information as to the state of each file in the mass storage of the communication device, a time stamp of the latest writing operation into the file;

reading said control file into the post-processing system, and comparing said control file to another control file (TTTCOF) which is in the memory of the post-processing system and which is updated during each transfer;

reading into the post-processing system those files of the communication device (DX) that, on the basis of the comparison of control files (TTSCOF, TTTCOF), have been modified since the latest updating of the control file of the post-processing system;

updating the control file of the post-processing system (TTTCOF) by marking said control file with information as to the files that have been transferred, and copying said information to the communication device (DX) for indicating the capacity made available in the mass storage of the communication device.

2. A method as claimed in claim 1, the control file of the postprocessing device is updated by marking it with information on the files that have been transferred and the date of the transfer for each file.

3. A method as claimed in claim 1, the files to be transferred, as to their status, are files that have become full.

4. A method as claimed in claim 1, the files to be transferred are all the files which have been modified since the latest updating of the control file (TTTCOF) of the postprocessing system.

5. A method as claimed in claims 1, the operating system (OS) of the post-processing system carries out at predetermined intervals a polling during which it reads the contents of the control file (TTSCOF) of the communication device (DX) and compares the contents to the contents of the control file (TTTCOF) which is in the memory of the post-processing system in order to determine the need for transfer of files of the communication system.

6. A method as claimed in claim 1, the files that have been transferred are stored in the mass storage of the communication device (DX) at least for a certain time, whereby an alarm is generated if the number of data files available for overwriting falls below a predetermined threshold level.

* * * * *

UNITED STATES PATENT AND TRADEMARK OFFICE
CERTIFICATE OF CORRECTION

PATENT NO. : 5,832,524

DATED : November 3, 1998

INVENTOR(S) : JÄRVENPÄÄ

Page 1 of 6

It is certified that error appears in the above-identified patent and that said Letters Patent is hereby corrected as shown below:

Title page item [57],

IN THE ABSTRACT

Line 3, change "maintains" to --by maintaining a--;

Line 4, delete "the" (first occurrence); and change "it" to --the control file--;

Line 5, change "the" (first occurrence) to --a--; and

Line 7, change "it" to --the files--.

Col. 1, before line 9, insert

--BACKGROUND OF THE INVENTION-- and

--1. Field of the Invention--;

before line 13, insert --2. Description of the Related Art--;

before line 38, insert --SUMMARY OF THE INVENTION--;

line 41, change "is characterized by" to --comprises:--;

line 42, change "the" to --a--;

line 43, change "the" (first occurrence) to --a-- and delete "the" (second occurrence);

UNITED STATES PATENT AND TRADEMARK OFFICE
CERTIFICATE OF CORRECTION

PATENT NO. : 5,832,524
DATED : November 3, 1998
INVENTOR(S) : JÄRVENPÄÄ

It is certified that error appears in the above-identified patent and that said Letters Patent is hereby corrected as shown below:

Col. 1  line 45, delete "into it";

line 47, change "the" to --a--;

line 48, change "the" to --a--;

line 50, insert --,-- after "reading", insert --,-- after "system", change "such" to --the-- and change "a" to --the--; and before line 62, insert --BRIEF DESCRIPTION OF THE DRAWINGS--.

Col. 2,  before line 1, insert --DETAILED DESCRIPTION OF THE PREFERRED EMBODIMENTS--;

line 12, change "a" (second occurrence) to --an X.25-- and delete "X.25"; and line 28, change "Date" to --A date--.

Col. 3,  line 9, change "the" (first occurrence) to --its own-- and delete "of its own";

line 12, delete "the";

line 24, change "the" to --a--, and delete "3";

line 25, change "of" (first occurrence) to --being-- and change "which have" to --having--;

line 34, insert --,-- after "TTSCOF" and insert --,-- after "itself";

UNITED STATES PATENT AND TRADEMARK OFFICE
CERTIFICATE OF CORRECTION

PATENT NO. : 5,832,524
DATED : November 3, 1998
INVENTOR(S) : JÄRVENPÄÄ

It is certified that error appears in the above-identified patent and that said Letters Patent is hereby corrected as shown below:

Col. 3, line 35, insert --associated-- before "data", delete "associ-";

line 36, change "ated with them, which " to --. The--;

line 37, insert --the-- before "status" and insert --,-- after "TTTCOF";

line 38, insert --is-- before "maintained" and delete "," (second occurrence) and line 39, change "only comprise" to --and comprises only--.

Col. 4, line 6, delete "the" and change "right so" to --access such--;

line 50, delete "the";

line 51, insert --, the method-- before "comprising";

line 52, delete "(TTSCOF)";

line 54, delete "the" (first occurrence), insert --at least one of a-- before "state", delete "file" and insert --of the files-- before "in";

line 55, insert --and-- before "a", delete "the" and insert --a-- before "latest"; and line 56, change "the" to --a-- and insert --of the files-- before ";".

UNITED STATES PATENT AND TRADEMARK OFFICE
CERTIFICATE OF CORRECTION

PATENT NO. : 5,832,524
DATED : November 3, 1998
INVENTOR(S) : JÄRVENPÄÄ

It is certified that error appears in the above-identified patent and that said Letters Patent is hereby corrected as shown below:

Col. 4, line 58, change "another" to --a second--;

line 59, delete "(TTTCOF)";

line 62, change "those" to --the--;

line 63, delete "(DX)" and delete "on the basis of the";

line 64, insert --based on a-- before "comparison" and insert --the control file and the second-- before "control" and change "files (TTSCOF, TTTCOF)" to --file--; and line 65, change "the" (first occurrence) to --a-- and insert --second-- before "control"; and line 66, insert --and-- after ";".

Col. 5, line 1, insert --second-- before "control";

line 2, delete "(TTTCOF);

line 5, delete "(DX)" and change "the" (first occurrence" to --a--;

line 7, change "the" (second occurrence) to --wherein the second--;

line 9, change "the" (second occurrence) to --a--; and line 10, change "file" to --of the files--.

UNITED STATES PATENT AND TRADEMARK OFFICE
CERTIFICATE OF CORRECTION

PATENT NO. : 5,832,524
DATED : November 3, 1998
INVENTOR(S) : JÄRVENPÄÄ

It is certified that error appears in the above-identified patent and that said Letters Patent is hereby corrected as shown below:

Col. 5, line 11, insert --wherein-- before "the";

line 12, delete ", as to their status," and insert --according to a respective status of each of the files-- after "full";

line 13, insert --wherein-- before "the";

line 14, insert --of-- before "the"; and line 15, insert --second-- before "control" and delete "(TTTCOF)".

Col. 6, line 1, change "the" to --wherein an--;

line 2, delete "(OS)";

line 3, insert --,-- before "a", insert --,-- after "polling", change "which it" to --the polling the post-processing system-- and delete "the";

line 4, delete "(TTSCOF)"; and line 5, delete "(DX)", delete "the" (first occurrence), insert --of the control file-- after "contents" (first occurrence), delete "the" (second occurrence) and insert --second-- after "the" (third occurrence).

UNITED STATES PATENT AND TRADEMARK OFFICE
CERTIFICATE OF CORRECTION

PATENT NO. : 5,832,524
DATED : November 3, 1998
INVENTOR(S) : JÄRVENPÄÄ

It is certified that error appears in the above-identified patent and that said Letters Patent is hereby corrected as shown below:

Col. 6     line 6, change "(TTTCOF)" to --,--;

line 7, insert --,-- after "system", change "the" to --a-- and change "for" to --to--;

line 8, change "of" to --the--;

line 9, insert --wherein-- before "the";

line 11, delete "(DX)";

line 12, change "the" to --a-- and change "data" to --the--.

Signed and Sealed this

Fifteenth Day of August, 2000

Attest:

Q. TODD DICKINSON

Attesting Officer     *Director of Patents and Trademarks*